United States Patent
Abeta et al.

(10) Patent No.: US 7,286,508 B2
(45) Date of Patent: Oct. 23, 2007

(54) SIGNAL FORMAT IN MULTI-CARRIER CDMA TRANSMISSION SYSTEM

(75) Inventors: Sadayuki Abeta, Yokosuka (JP); Hiroyuki Atarashi, Yokohama (JP); Mamoru Sawahashi, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 977 days.

(21) Appl. No.: 09/914,781

(22) PCT Filed: Dec. 27, 2000

(86) PCT No.: PCT/JP00/09315

§ 371 (c)(1), (2), (4) Date: Sep. 5, 2001

(87) PCT Pub. No.: WO01/50655

PCT Pub. Date: Jul. 12, 2001

(65) Prior Publication Data

US 2002/0136176 A1 Sep. 26, 2002

(30) Foreign Application Priority Data

Jan. 5, 2000 (JP) ............................ 2000-000543

(51) Int. Cl.
*H04B 7/216* (2006.01)
*H04B 7/212* (2006.01)
*H04J 3/06* (2006.01)

(52) U.S. Cl. .................. 370/335; 370/348; 370/350; 370/443; 375/219

(58) Field of Classification Search .......... 370/335, 370/329, 320, 342, 441, 336, 337, 310, 312, 370/328, 343, 480, 481, 482, 535, 350, 479, 370/500, 468, 203, 211, 437, 503, 491, 204, 370/205, 208, 465, 483, 496; 375/130, 140, 375/256, 347, 269, 272, 271, 273, 274, 336, 375/308, 305, 303, 302, 200, 141, 145, 149, 375/267, 260, 227, 134, 137; 455/455, 502, 455/509, 516, 62, 135, 504, 506, 139, 52.1
See application file for complete search history.

(56) References Cited

U.S. PATENT DOCUMENTS 6,084,871 A * 7/2000 Engstrom et al. ........... 370/350
6,175,558 B1 * 1/2001 Miya ........................ 370/335
6,188,679 B1 * 2/2001 Sato ......................... 370/335

(Continued)

FOREIGN PATENT DOCUMENTS

| CA | 1 252 234 | 4/1989 |
|---|---|---|
| EP | 0795969 A | 9/1997 |
| JP | 10-28077 | 1/1998 |

(Continued)

OTHER PUBLICATIONS

Yukiko Hanada, et al., Proceedings of the 1999 IEICE General Conference, The Institute of Electronics, Information and Communication Engineers, p. 369, "OFDM/DS-CDMA Packet Musen Access Ni Oekru Pilot Douki Kenha", Mar. 25-28, 1999.

(Continued)

*Primary Examiner*—Chi Pham
*Assistant Examiner*—Melanie Jagannathan
(74) *Attorney, Agent, or Firm*—Oblon, Spivak, McClelland, Maier & Neustadt, P.C.

(57) ABSTRACT

A multi-carrier CDMA transmission system signal format that reproduces data symbols, aligns the reproduced data symbols along a frequency axis, multiplies the reproduced data symbols by a spreading code, and conducts multiplex transmission of data using a plurality of sub-carriers of different frequencies, in which a common pilot symbol inserted in a transmission signal for estimating a variation in channel and estimating a channel common to each of a plurality of users, and a user-specific individual pilot symbol transmitted along a channel different from the above-described channel.

4 Claims, 8 Drawing Sheets

U.S. PATENT DOCUMENTS

| | | | |
|---|---|---|---|
| 6,282,185 B1 * | 8/2001 | Hakkinen et al. | 370/342 |
| 6,347,220 B1 * | 2/2002 | Tanaka et al. | 455/277.2 |
| 6,385,181 B1 * | 5/2002 | Tsutsui et al. | 370/335 |
| 6,628,698 B1 * | 9/2003 | Oda | 375/147 |
| 6,643,333 B1 * | 11/2003 | Berens et al. | 375/295 |
| 6,728,307 B1 * | 4/2004 | Derryberry et al. | 375/219 |
| 6,904,283 B2 * | 6/2005 | Li et al. | 455/450 |
| 6,937,665 B1 * | 8/2005 | Vandenameele | 375/260 |
| 6,999,467 B2 * | 2/2006 | Krauss et al. | 370/441 |

FOREIGN PATENT DOCUMENTS

| | | |
|---|---|---|
| JP | 11-514827 | 12/1999 |
| JP | 2000-201134 | 7/2000 |
| WO | WO 96/00471 | 1/1976 |
| WO | WO 9810542 A | 3/1998 |
| WO | WO 98/10542 | 3/1998 |

OTHER PUBLICATIONS

Hiroyuki Arate, et al., Technical Research Report, RCS99–131,The Institute of Electronics, Information and Communication Engineers, "Agari Link Broad Band Musen Packet Densou Ni Okeru SC/DS–CDMA, MC–CDMA Houshiki No Tokusei Hikaku", Oct. 15, 1999.

Hiroyuki Atarashi, et al., Technical Report of IEICE, A–P99–134, RCS99–131, The Institute of Electronics, Information and Communication Engineers, vol. 99, No. 357, pp. 71–77, "Performance Comparisons of Coherent SC/DS–CDMA, MC/DS–CDMA on Up–Link Broadband Radio Packet Transmission", Oct. 1999 (with English Abstract).

Seiichi Sampei, The Transactions of the Institute of Electronics, Information and Communication Engineers, vol. J72–B–II, No. 1, pp. 7–15, "Rayleigh Fading Compensation Method for 16QAM Modem in Digital Land Mobile Radio Systems", Jan. 1989 (with English translation).

Yukiko Hanada, et al., Proceedings of the 1999 IEICE General Conference, The Institute of Electronics, Information and Communication Engineers, p. 369, "OFDM/DS–CDMA Packet Musen Access Ni Oekru Pilot Douki Kenha", Mar. 25–28, 1999 (submitting English Translation only) ("Coherent Detection with Pilot Symbol in OFDM/DS–CDMA Packet Radio Access", pp. 4–3)

Hiroyuki Atarashi, et al., Technical Report of IEICE, A–P99–134, RCS99–131, The Institute of Electronics, Information and Communication Engineeres, vol. 99, No. 357, pp. 71–77, "Performance Comparisons of Coherent SC/DS–CDMA, MC/DS–CDMA on Up–Link Broadband Radio Packet Transmission", Oct. 1999 (submitting English translation only, pp. 4–16).

Hara, S. et al., "Spread Spectrum–Based Subcarrier Recovery Method for Multi–Carrier Code Division Multiplexing System", European Transactions on Telecommunications, Wiley & Sons, vol. 10, No. 4, Jul. 1999, pp. 369–376.

Dong–Seog, Han, et al., "On the Synchronization of MC–CDMA System for Indoor Wireless Communications", Vehicular Technology Conference, vol. 2, No. 19, Sept. 1999, pp. 693–697.

Kaiser, S. et al., "Performance of Multi–Carrier CDMA Systems with Channel Estimation in Two Dimensions", Personal, Indoor and Mobile Radio Communications, vol. 1, No. 1, Sept. 1997, pp. 115–119.

* cited by examiner

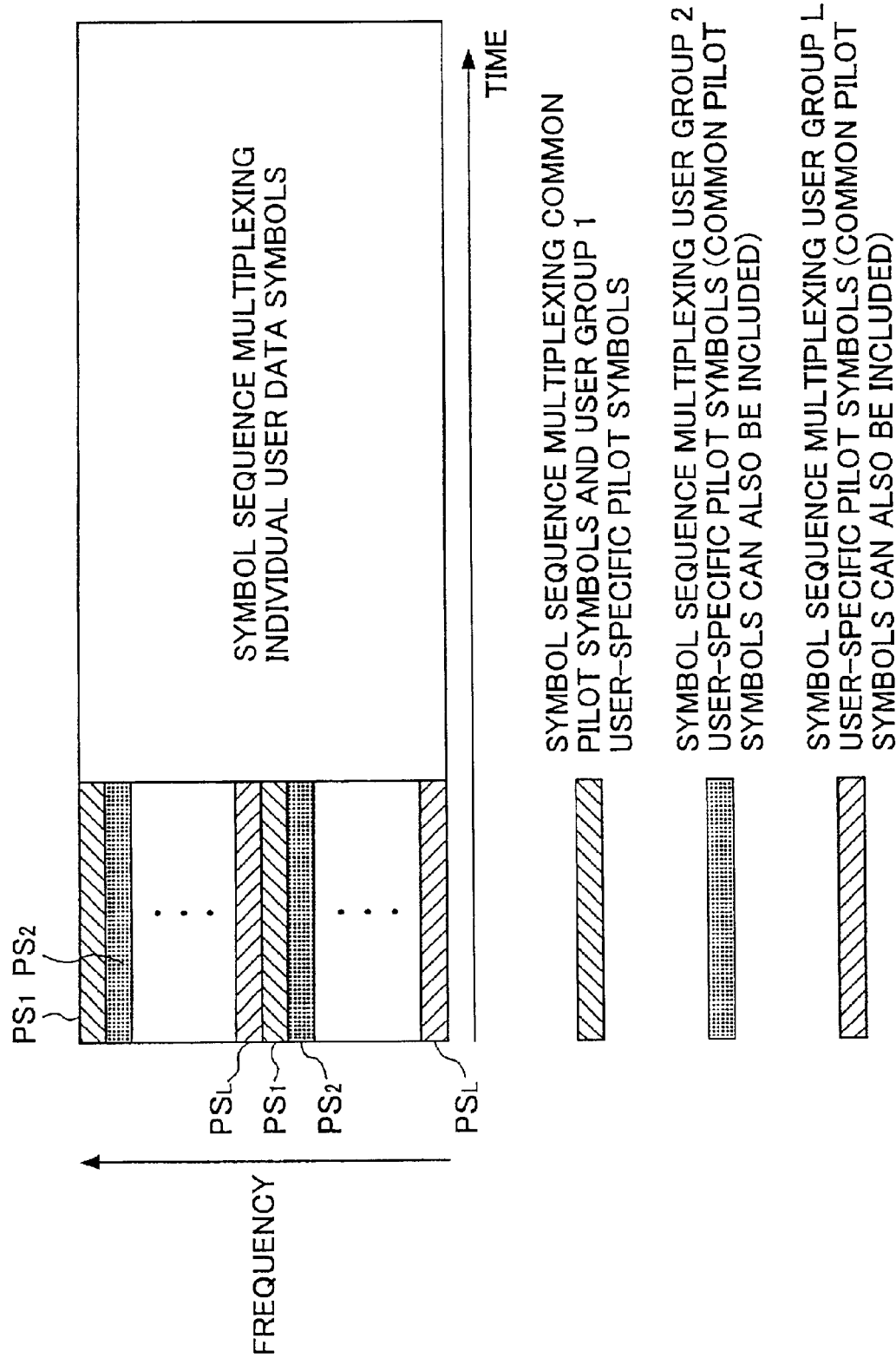

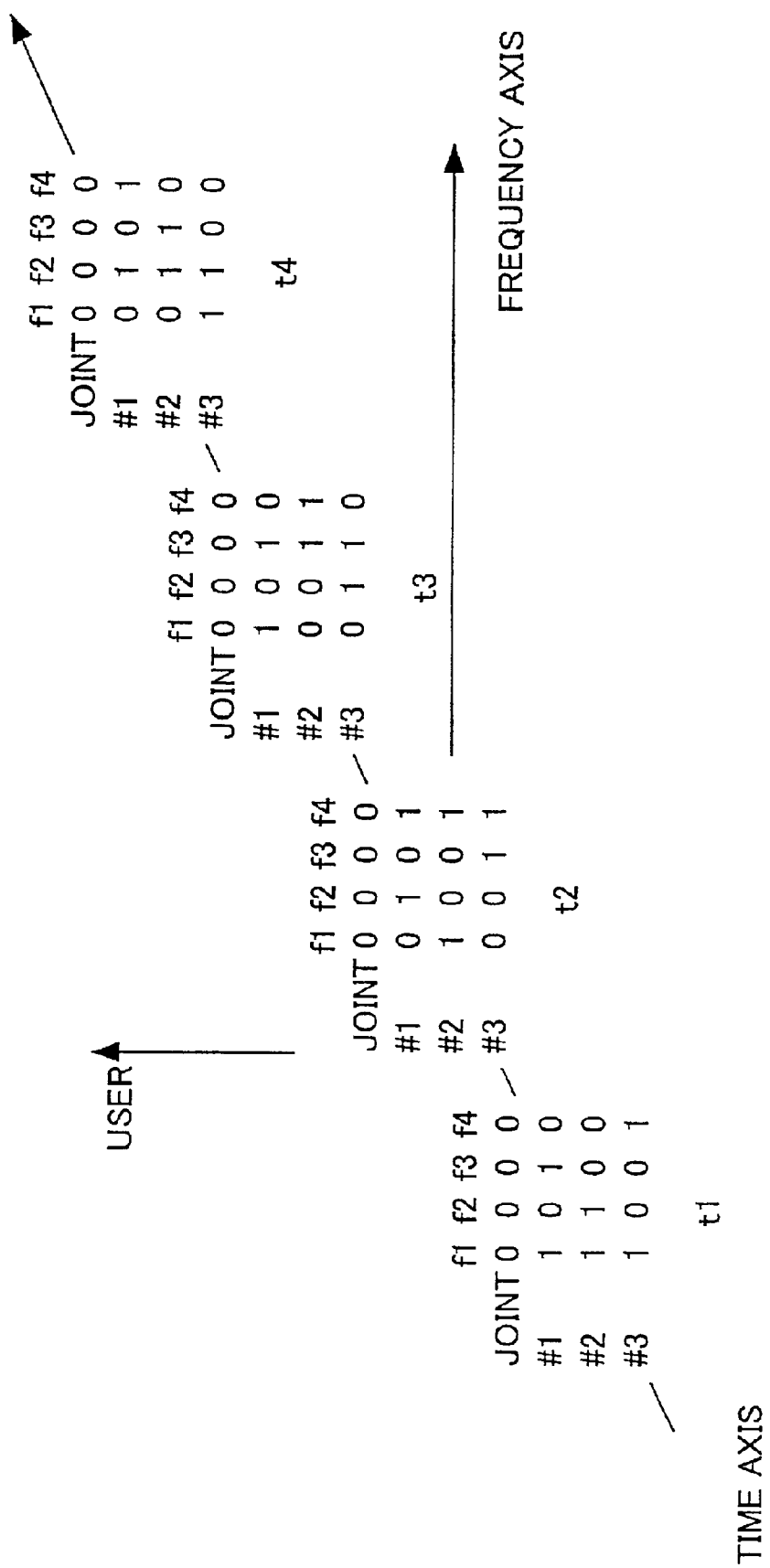

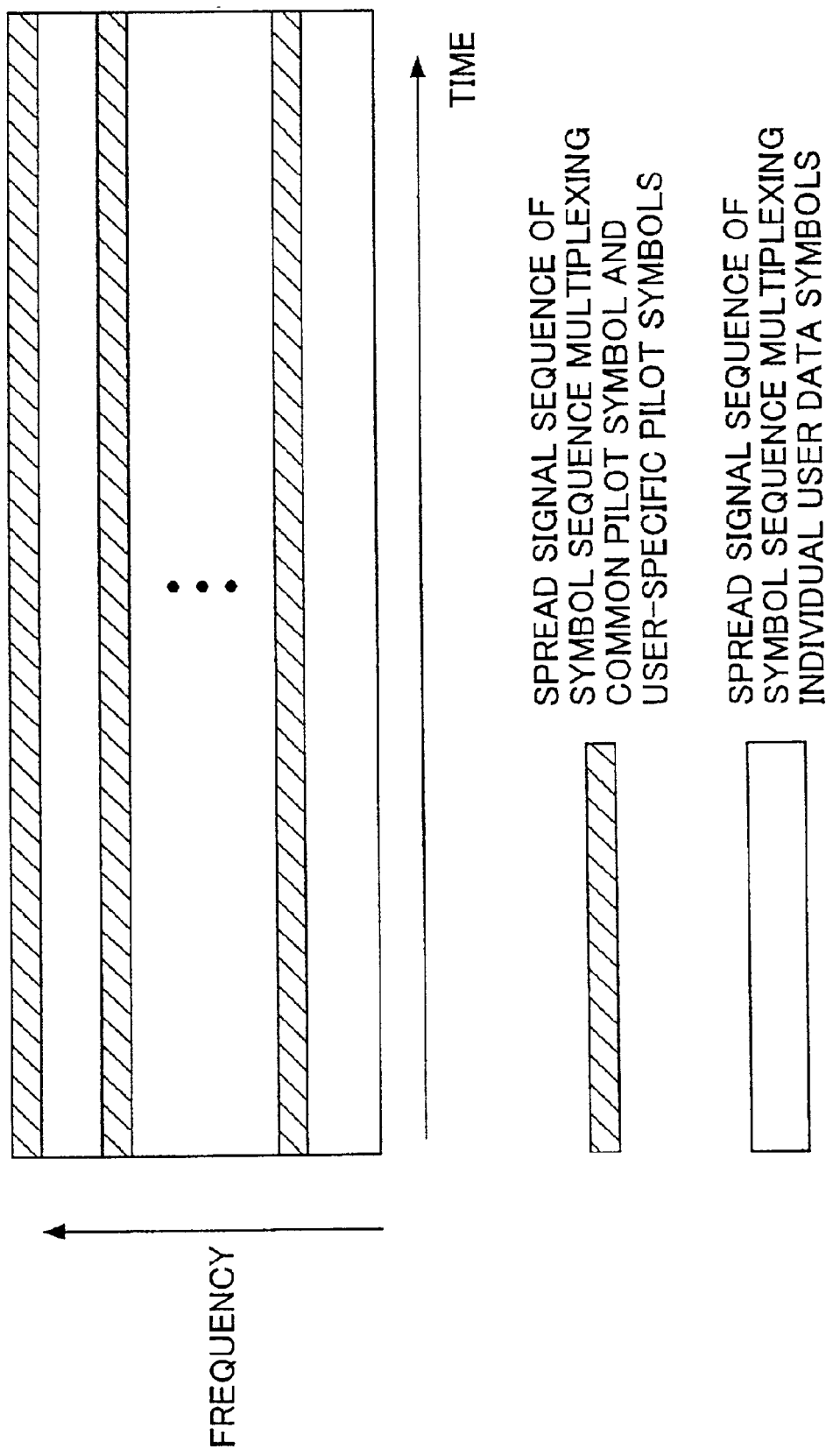

SIGNAL FORMAT IN MULTI-CARRIER CDMA TRANSMISSION SYSTEM

TECHNICAL FIELD

The present invention relates to a multi-carrier CDMA transmission system signal format, and more particularly, to a signal format of a signal transmitted via a multi-carrier CDMA transmission system, the signal including data symbols and a pilot symbol for the purpose of estimating a channel state for each of a plurality of users.

BACKGROUND ART

In a mobile communications environment, reception signals can undergo amplitude variations and phase variations due to Rayleigh fading attendant upon changes in the relative positions of the base station and the mobile station. In phase modulation systems, typically, data is transmitted by the carrier wave phase of symbols before and after operational coding, and, on the receiving end, information data is recognized and read using differential detection. However, because differential detection involves operational coding of the transmission data as described above, a 1-bit error in the wireless interval amounts to a 2-bit error in the information data, so in binary phase-shift keying systems (BPSK modulation), which involve synchronous detection, the signal power to noise power ratio (SNR) will be degraded for the same bit error rate (by, for example, approximately 3 dB).

Additionally, although absolute synchronous detection for measuring a reception signal phase at an absolute phase of each individual symbol makes for highly efficient reception, it is difficult to determine a reception signal absolute phase in a Rayleigh fading environment.

Thus, for example, a method of estimating and correcting fading distortion using pilot symbols of known phase inserted at regular intervals between data symbols has been proposed (Sampei, "16 QAM Fading Distortion Correction for Terrestrial Mobile Communications", *Denshi Joho Tsushin Gakkaishi*, Vol. J72–B–II No. 1, pp. 7–15, January 1989). In this method, one pilot symbol of known transmission phase is inserted every several data symbols in a communications channel and the channel estimated using the received phase of the pilot symbol. That is, amplitude and phase of a reception signal for each transmission user at pilot symbols at the beginning and end of such data symbol interval are measured, and a variation in the channel for the data symbol interval is estimated by interpolation between the measured values.

Additionally, in mobile communications systems according to the IS-95 (CDMA transmission system) currently in service, the downlink involves using a pilot channel common to all users, with encoded multiplex signal transmission accomplished by using a code orthogonal to a spreading code for each user. At the receiving end, the pilot channel and the data channel are separated by despreading, a channel variation is estimated using the pilot channel, and the data symbols are demodulated using the estimation results.

However, in a multi-carrier CDMA transmission system, a plurality of sub-carriers are used to perform data symbol transmission, with different channel variations for each sub-carrier. Additionally, the transmission signal is spread in the sub-carrier direction, so at the receiving end it is necessary to make an estimation for each sub-carrier at the chip level prior to despreading. As a result, it is not possible to employ directly the channel variation estimation method employed in transmission systems that use direct spreading (DSCDMA) such as IS-95 described above in a multi-carrier CDMA transmission system.

Additionally, in a direct-sequence spreading system (DS-CDMA) such as IS-95, in which it is assumed that transmission takes place with each user (each mobile station) using the same channel, it is possible to estimate the channel by multiplexing the pilot channel common to all users. However, in cases, for example, in which communications are conducted by using a user-specific beam pattern for each user (that is, each mobile station) using an adaptive array antenna, the common channel and the channel for individual users differ, so channel estimates for the common pilot channel cannot be used for the channels for individual users.

DISCLOSURE OF THE INVENTION

The present invention has as its overall object to provide a new and useful multi-carrier CDMA transmission system signal format, in which the above-described problems of the conventional art are solved.

The present invention has as its specific object to provide a signal format in a multi-carrier CDMA transmission system in which channel estimation can be performed for each user.

The above-described object of the present invention is achieved by, in a multi-carrier CDMA transmission system that reproduces data symbols, aligns the reproduced data symbols along a frequency axis, multiplies the reproduced data symbols by a spreading code and performs multiplex transmission of data using a plurality of sub-carriers of different frequencies, a signal format of a transmission signal used when inserting a pilot symbol for estimating a variation of channel and performing synchronous detection, the pilot symbol being a common pilot symbol for the purpose of estimating a channel common to each user, the signal format including a user-specific pilot symbol that performs communication in a channel different from the above-described channel.

In such a signal format, a variation in channel common to each user can be estimated at the receiving end based on a change (frequency variation, phase variation) in common pilot symbol.

Additionally, a state of a user-specific channel can be estimated at the receiving end based on a change in the individual pilot symbol even when the user-specific channel is formed using an adaptive array antenna.

The channel common to individual users as described above is a channel that can be utilized in common by all users, and may for example be formed using the data channel or the same antenna pattern as for the data channel.

In the above-described multi-carrier CDMA transmission system signal format, all or some of the plurality of sub-carriers used in signal transmission can be used as sub-carriers when spreading the pilot symbol along a frequency axis.

Additionally, at the receiving end, in terms of being able to separate the pilot symbols easily, the pilot symbols can be made to be orthogonal on the spread frequency axis, and further, pilot symbol sequences can be made to be orthogonal on the time axis.

Further, the above-described multi-carrier CDMA transmission system signal format can be configured so that the signal format allots some of the plurality of sub-carriers used in the signal transmission to the pilot symbol discretely along the frequency axis and inserts a symbol sequence that multiplexes the common pilot symbol and the individual pilot symbol using a spreading signal in a direction of the time axis into the sub-carriers allotted to the pilot symbol.

At the receiving end, in terms of being able to separate the pilot symbols easily, the spreading code for the common pilot symbol and the spreading code for the specific pilot symbol can be made to be orthogonal.

These and other objects, features and advantages of the present invention will become more apparent from the following detailed description with reference to the accompanying drawings.

BRIEF DESCRIPTION OF THE DRAWINGS

FIG. 6 is a diagram showing a fourth example of a signal format.

FIG. 7 is a diagram showing an example of a spreading code configuration for a user-specific pilot symbol.

FIG. 8 is a diagram showing a fifth example of a signal format.

PREFERRED EMBODIMENTS FOR WORKING THE INVENTION

A description will now be given of embodiments of the present invention, with reference to the drawings.

Figure 1:
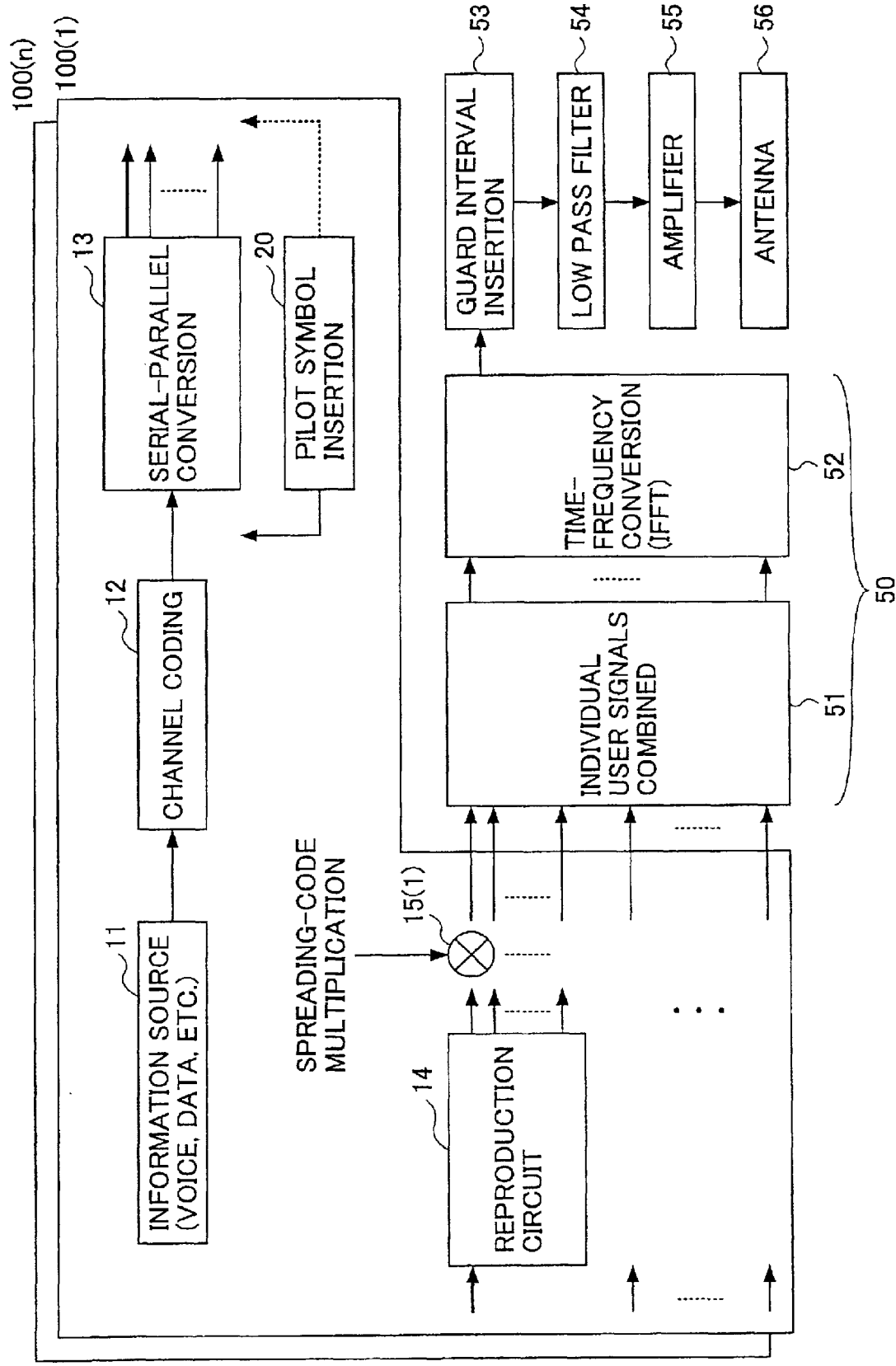
FIG. 1 is a diagram showing an example of a transmitter configuration for transmitting a signal having a signal format according to one embodiment of the present invention.

A transmitter that transmits a signal of a signal format according to one embodiment of the present invention is configured, for example, as shown in FIG. 1.

The transmitter is provided at a base station of a multi-carrier CDMA transmission system.

In FIG. 1, the transmitter has signal generator circuits 100(1) . . . 100(n) corresponding to individual users (mobile stations). Each signal generator circuit 100(1) . . . 100(n) generates a signal corresponding to each user, so the transmitter has an data source 11 of the information (voice, data, etc.) that is to be allotted to each user, a channel coding unit 12 that encrypts the data from the data source 11 according to a predetermined algorithm, a serial-parallel conversion circuit 13 for transmitting a plurality of symbols simultaneously, a reproduction circuit 14 that reproduces the data (data symbols) from the serial-parallel conversion circuit 13 in a quantity to equal to the number of sub-carriers used in spreading, and a modulator 15(i) that multiplies each signal reproduced by the reproduction circuit 14 by a spreading code c.

Additionally, each signal generator circuit 100(1) . . . 100(n) has a pilot symbol insertion circuit 20 for each user. The pilot symbol insertion circuit 20 inserts (or adds) a pilot symbol corresponding to each user to the data (data symbols) from the channel coding unit 12. The pilot symbol is used for estimating a state (amplitude variation, phase variation) of a channel between the users (mobile stations) and the base station.

It should be noted that the above-described pilot symbol insertion circuit 20 can be configured so as to insert (or add) a pilot symbol corresponding to each user to an output from the serial-parallel conversion circuit 13.

According to the above-described configuration, each signal generator circuit 100(1) . . . 100(n) outputs as a signal to each user a spread signal obtained by multiplying the data symbol by the spreading code and a pilot symbol corresponding to each user. Then, a signal of each component of each frequency output from each signal generator circuit 100(1) . . . 100(n) is multiplexed by a multiplexer 50. The multiplexer 50 is composed of a combination unit 51 that combines the signals from the transmission signal generator circuits 100(1) . . . 100(n) and a frequency-time conversion unit 52 (IFFT) that performs frequency-time conversion of the signals combined by the combination unit 51.

Figure 2:
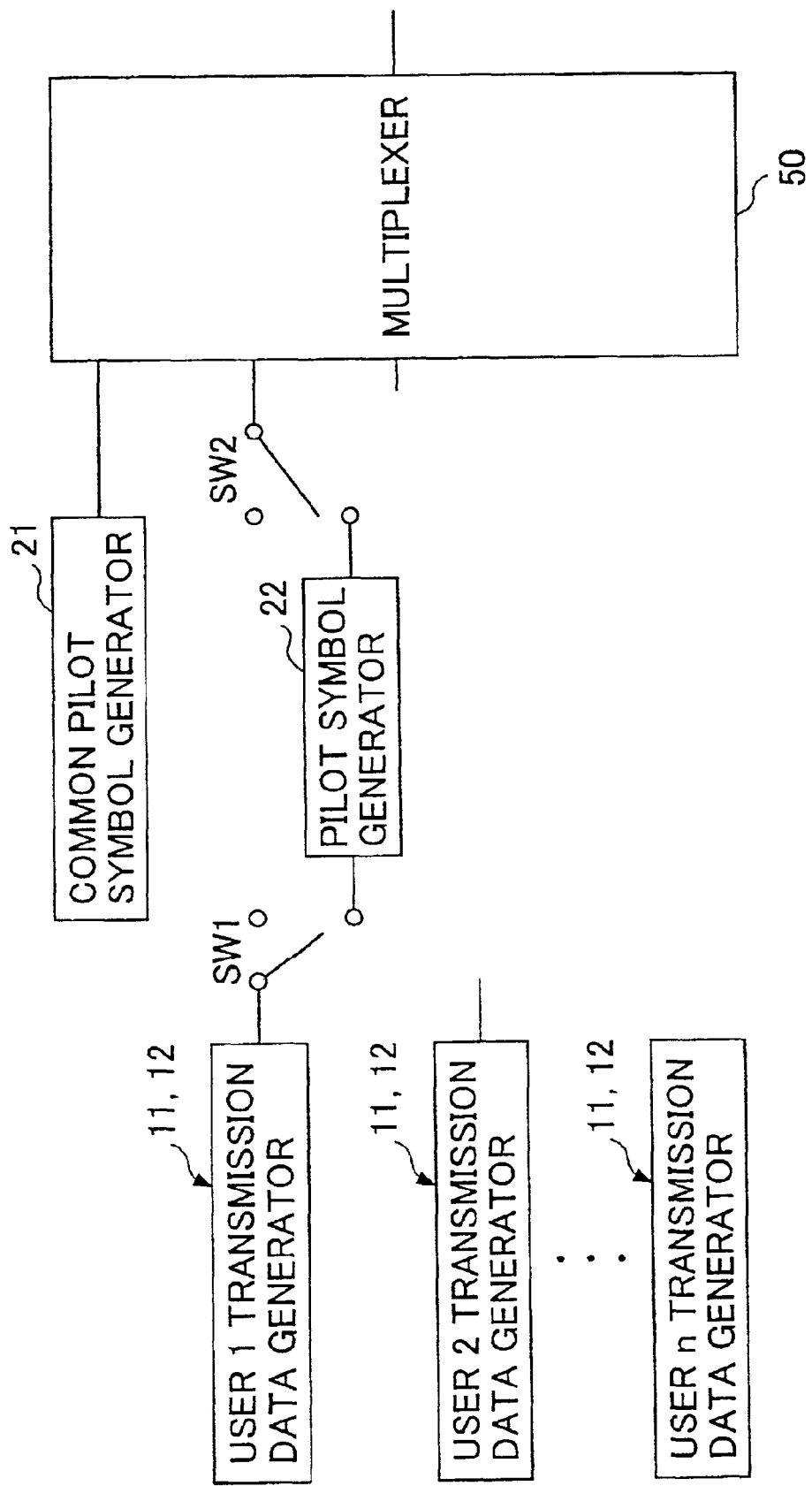
FIG. 2 is a block diagram showing a specific example of a configuration of a pilot symbol insertion circuit.

The pilot symbol insertion circuits 20 of the signal generator circuits 100(1) . . . 100(n) described above are, for example, configured as shown in FIG. 2. That is, each has a switch SW1, SW2 and a pilot symbol generator 22 corresponding to each user. The switches SW1, SW2 are switched so as to select the pilot symbol generator 22 for a user conducting transmission with a user-specific antenna pattern from an adaptive array antenna or the like that differs from the data channel. As a result, a user-specific pilot symbol special to such user is inserted (or added) from the pilot symbol generator 22 to the signals (data symbols) from that user's transmission data generator (data source 11, channel coding unit 12).

Additionally, separate from the pilot symbol generator 22 corresponding to each user as described above, the transmitter has a common pilot symbol generator 21 (not shown in FIG. 1). The common pilot symbol generator 21 generates a common pilot symbol used for a user conducting transmission with a pattern that is the same as the antenna pattern used when transmitting a data channel and a channel common to all users such as a data channel. For users using the common pilot symbol, the switches SW1 and SW2 select a path that bypasses the pilot symbol generator 22, and the signal from the transmission data generator (data source 11, channel coding unit 12) is supplied to the multiplexer 50 without having a user-specific pilot symbol inserted (or added).

Thus, signals in which common and user-specific pilot symbols and data symbols are multiplexed as described above are processed by a guard interval insertion unit 53, a filter 54 and an amplifier 55, and the processed signals are transmitted from an antenna unit 56. The antenna unit 56 has for example an adaptive array antenna, and so it is possible to generate a beam pattern for each individual user (mobile station).

A description will now be given of a composition of a frame of a transmission signal that includes common and user-specific pilot symbols and a data symbol at a transmitter having the configuration described above.

Figure 3:
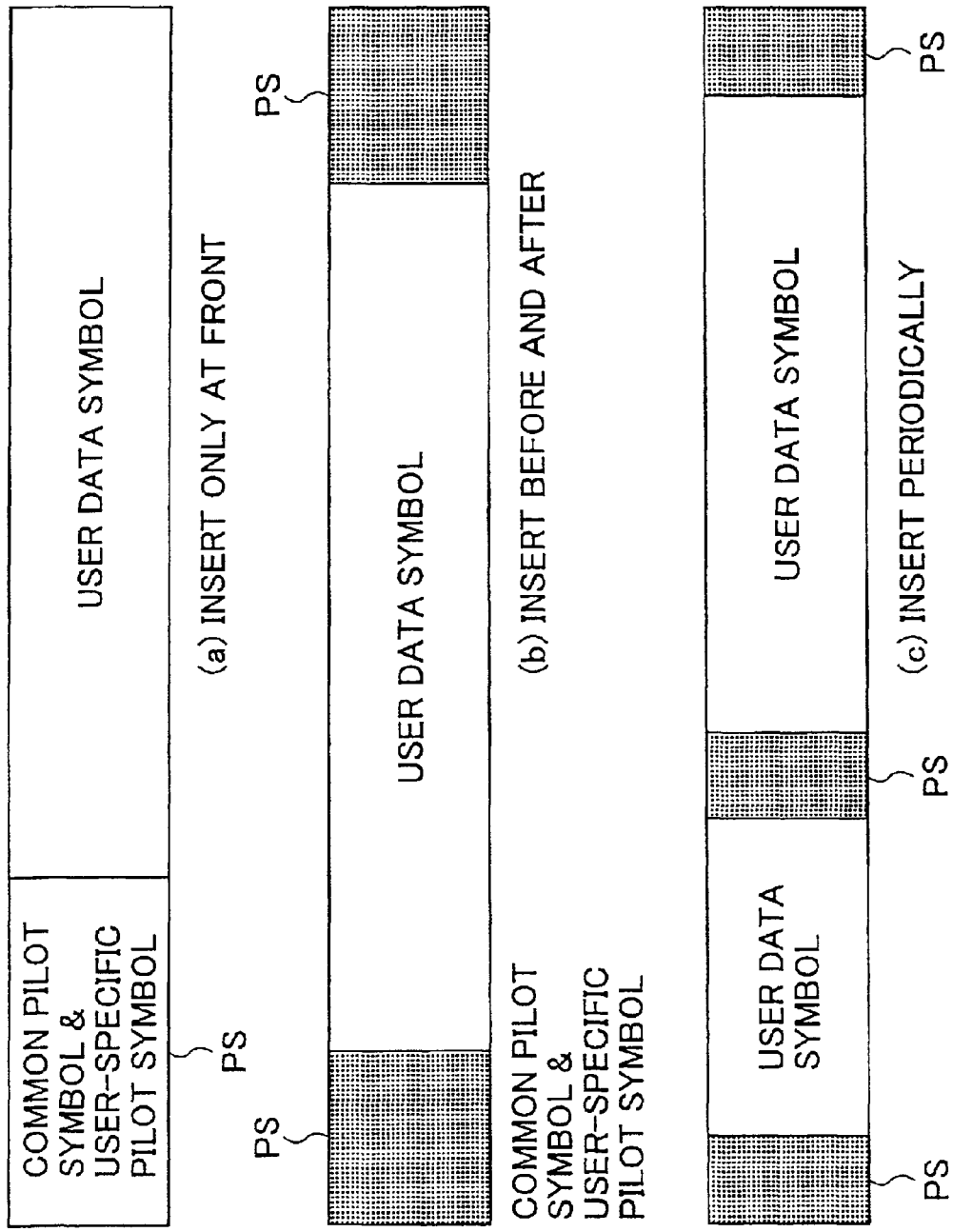
FIG. 3 is a diagram showing a first example of a signal format.

In a first example, as shown in FIG. 3, the common and user-specific pilot symbols and the data symbol are time multiplexed. It is possible to insert the pilot symbol group PS at only the head of a frame immediately preceding the user data symbol (se FIG. 3(a)), at the head and tail of the frames immediately preceding and succeeding the user data symbol (FIG. 3(b)), or periodically within the frame (see FIG. 3(c)). If the pilot symbol length is $2^N$, then user-specific pilot symbols can be allotted among $2^N$ users.

Figure 4:
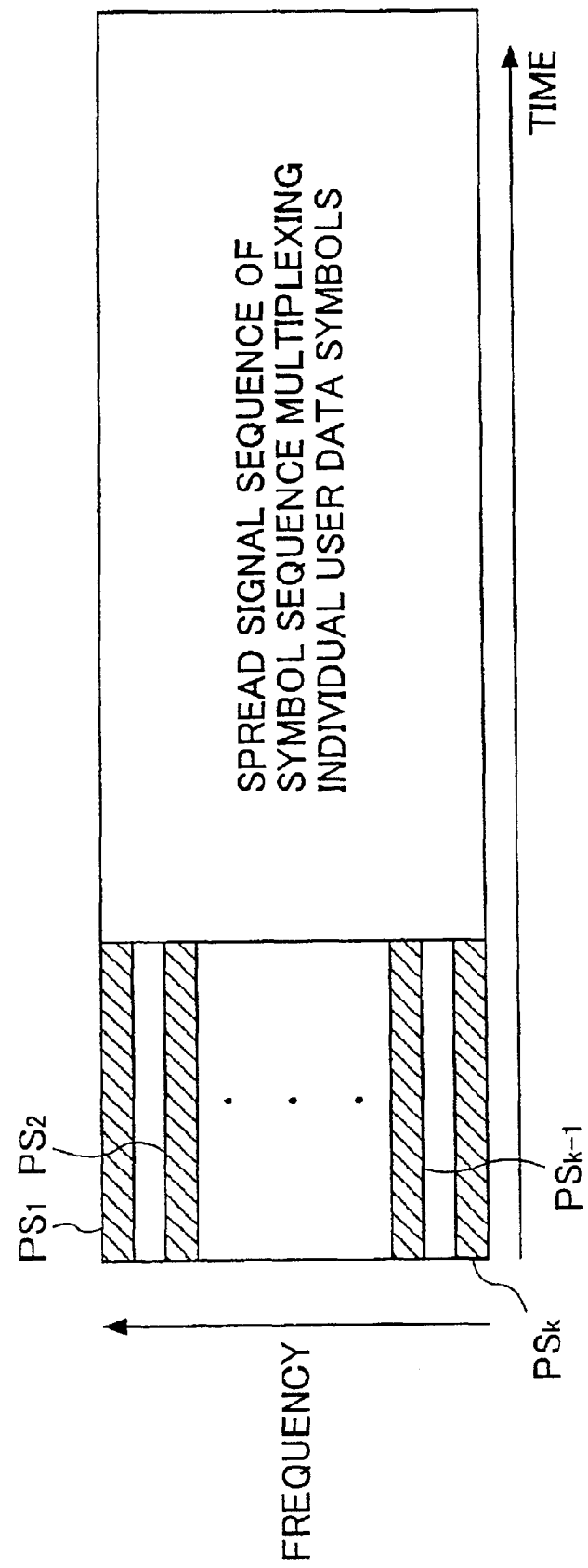
FIG. 4 is a diagram showing a second example of a signal format.

In a second example, as shown in FIG. 4, a symbol sequence PS1 . . . PSk in which common and user-specific pilot symbols have been multiplexed is inserted before a spread signal sequence of a symbol sequence in which individual user data symbols have been multiplexed. In this example, a distinctive feature is that k number of sub-carriers out of n number of sub-carriers is used to spread the pilot symbol. It thus becomes possible to transmit data symbols for those sub-carriers in which no pilot symbol is inserted.

Figure 5:
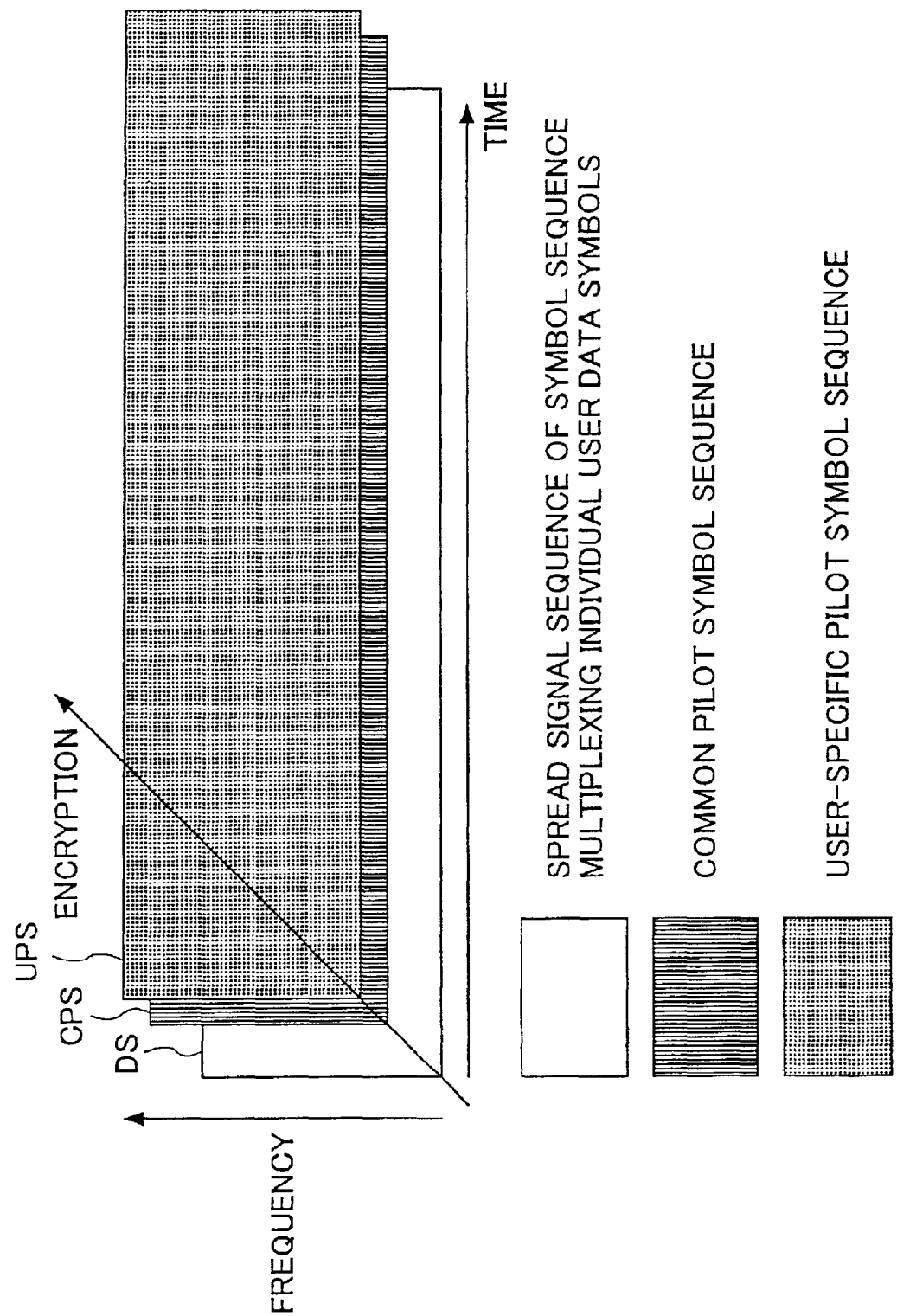
FIG. 5 is a diagram showing a third example of a signal format.

In a third example, as shown in FIG. 5, a spread signal sequence DS of a symbol sequence in which a common pilot symbol sequence CPS, a user-specific pilot symbol sequence UPS and individual user data symbols have been multiplexed is multiplexed. That is, each pilot symbol has been spread along a frequency axis and a time axis. Here, the length of a single data symbol DS corresponds to a length of one chip of a UPS and each pilot symbol CPS, so that at the receiving end the pilot symbol can be removed by multiplying by the pilot pattern.

In a fourth example, as shown in FIG. 6, users using user-specific pilot symbols are divided into L groups and pilot symbols inserted periodically. That is, before a spread signal sequence of a symbol sequence in which individual user data symbols have been multiplexed are inserted at predetermined intervals in a direction of the frequency axis, in order, from a symbol sequence PS1 multiplexing a common pilot symbol and user group 1 user-specific pilot symbols to a symbol sequence PS2 multiplexing user group 2 user-specific pilot symbols (in which common pilot symbols may be included) to a symbol sequence PSL user group L multiplexing user group L user-specific pilot symbols (in which common pilot symbols may be included). By such a configuration, is the number of pilot symbols is $2^N$, then it is possible to a lot user-specific pilot symbols among $2^N \times L$ users.

The configuration of the spreading code for the common and user-specific pilot signals may for example be as shown in FIG. 7.

In this example, one common pilot symbol (common) and three user-specific pilot symbols (#1, #2 and #3 (are used). Additionally, it is assumed that all pilot symbols assume the value "1".

At a time t1, each pilot symbol (common, #1, #2 and #3) is orthogonal to the coding sequence spread in a frequency direction. At a time t2 synchronized with the next symbol, the spreading code shifts by one chip. This operation performs pilot symbol cyclicization. In so doing, the pilot symbols are orthogonal to each other at each respective sub-carrier f1, f2, f3 and f4, and by multiplying by the codes of each respective time from t1 to t4 it is possible to separate the common pilot sequence (common) and the user-specific pilot sequences (#1, #2, #3) allotted among individual users. As a result, by studying a state (amplitude variation, phase variation) of each pilot symbol obtained by separation, a state of each individual channel (data channel (common), channel #1, channel #2, channel #3) can be estimated.

Further, a description will be given of a fifth example of a frame configuration of a transmission signal that includes common and user-specific pilot symbols and data symbols.

In this example, as shown in FIG. 8, every p carrier among n number of sub-carriers is used as a pilot carrier just for the pilot symbols, with the other carriers used for the spread signal sequence of the symbol sequence in which individual user data symbols have been multiplexed. For each pilot carrier, a symbol sequence is transmitted in which a common pilot and a user-specific pilot symbol have been multiplexed.

It is preferable that a pilot pattern having the smallest possible correlation (for example an orthogonal code) be used as the pilot sequence.

According to such a frame configuration, the period of the pilot pattern can be lengthened and it is easy to reduce the correlation between pilot patterns.

Additionally, a state of a channel of a sub-carrier other than the pilot carrier can be obtained at the receiving end from the channel state estimated from the pilot carrier using a method such as, for example, interpolation.

As described above, according to the present invention a state of a channel common to all users can be estimated at the receiving end on the basis of a change (amplitude variation, phase variation) in the pilot symbols. At the same time, even when having user-specific pilot symbols for users and using an adaptive array antenna to form a user-specific channel, by making the above-described user-specific pilot symbols correspond to a specific user, a channel state corresponding to such user can be estimated at the receiving end on the basis of changes in the user-specific pilot symbol. Accordingly, even in a multi-carrier CDMA transmission system in which individual users utilize a common channel such as a data channel, or utilize user-specific channels, channel estimates can still be performed for each individual user.

What is claimed is:

1. A method for performing multi-carrier CDMA transmission, comprising:
    reproducing data symbols;
    aligning the reproduced data symbols along a frequency axis;
    multiplying the reproduced data symbols by a spreading code;
    performing multiplex transmission of the multiplied data using a plurality of sub-carriers of different frequencies; and
    inserting, into the transmitted data, a pilot symbol for estimating a variation of a channel and performing synchronous detection, the pilot symbol comprising a common pilot symbol for the purpose of estimating a channel common to each user, and a user-specific pilot symbol that performs communication in a channel different from the channel common to each user, wherein
    the pilot symbols are orthogonal on the spread frequency axis, and pilot symbol sequences are orthogonal on a time axis.

2. The method of claim 1, wherein all or some of the plurality of sub-carriers used in signal transmission are used as sub-carriers when spreading the pilot symbol along a frequency axis.

3. A method for performing multi-carrier CDMA transmission, comprising:
    reproducing data symbols;
    aligning the reproduced data symbols along a frequency axis;
    multiplying the reproduced data symbols by a spreading code;
    performing multiplex transmission of the multiplied data using a plurality of sub-carriers of different frequencies; and
    inserting, into the transmitted data, a pilot symbol for estimating a variation of a channel and performing synchronous detection, the pilot symbol comprising a common pilot symbol for the purpose of estimating a channel common to each user, and a user-specific pilot symbol that performs communication in a channel different from the channel common to each user, wherein
    a format of the transmitted data allots some of the plurality of sub-carriers used in the signal transmission to the pilot symbols discretely along the frequency axis and inserts a symbol sequence that multiplexes the common pilot symbol and the user-specific pilot symbol using a spreading signal in a direction of the time axis into the sub-carriers allotted to the pilot symbols.

4. The method of claim 3, wherein the spreading code for the common pilot symbol and the spreading code for the specific pilot symbol are orthogonal.

* * * * *